(12) United States Patent
Prakash et al.

(10) Patent No.: US 9,116,238 B2
(45) Date of Patent: Aug. 25, 2015

(54) CONFIGURABLE ULTRASOUND MEASUREMENT LOGIC IN A MOBILE COMPUTING DEVICE

(75) Inventors: Gyan Prakash, Beaverton, OR (US); Kannan G. Raja, Beaverton, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 13/171,070

(22) Filed: Jun. 28, 2011

(65) Prior Publication Data

US 2013/0003502 A1 Jan. 3, 2013

(51) Int. Cl.
*G01S 15/00* (2006.01)
*G01S 15/88* (2006.01)
*G01S 15/58* (2006.01)

(52) U.S. Cl.
CPC . *G01S 15/88* (2013.01); *G01S 15/58* (2013.01)

(58) Field of Classification Search
CPC ............ G01S 7/52; G01S 15/58; G01S 15/88
See application file for complete search history.

(56) References Cited

U.S. PATENT DOCUMENTS

| | | | |
|---|---|---|---|
| 4,658,648 A | 4/1987 | Roddeck et al. | |
| 6,471,651 B1 * | 10/2002 | Hwang et al. | 600/459 |
| 6,824,518 B2 * | 11/2004 | Von Behren et al. | 600/443 |
| 2005/0128099 A1 | 6/2005 | Drouin et al. | |
| 2006/0074320 A1 * | 4/2006 | Yoo et al. | 600/472 |
| 2009/0108067 A1 * | 4/2009 | Roquemore | 235/462.15 |
| 2009/0279389 A1 | 11/2009 | Irie | |
| 2010/0324418 A1 * | 12/2010 | El-Aklouk et al. | 600/441 |
| 2011/0034209 A1 * | 2/2011 | Rubinsky et al. | 455/556.1 |
| 2011/0044133 A1 | 2/2011 | Tokita | |

FOREIGN PATENT DOCUMENTS

WO 2013003263 A2 1/2013

OTHER PUBLICATIONS

International Search Report and Written Opinion received for International Application No. PCT/US2012/043959, mailed Jan. 21, 2013, 9 pages.
International Preliminary Report on Patentability received for PCT Application No. PCT/US2012/043959, mailed on Jan. 16, 2014, 6 pages.

* cited by examiner

*Primary Examiner* — Isam Alsomiri
*Assistant Examiner* — Hovhannes Baghdasaryan
(74) *Attorney, Agent, or Firm* — Barnes & Thornburg LLP (57) ABSTRACT

A device, system, method, and machine readable medium for configurable ultrasound Doppler measurements from a mobile device are disclosed. In one embodiment, the device includes an oscillator capable of generating an ultrasound frequency sound wave. The device also includes an ultrasound emission module capable of emitting a first ultrasound wave at a first frequency and at a first power level and a second ultrasound wave at a second frequency and at a second power level. The device also an ultrasound receiver and amplifier module capable of receiving and amplifying ultrasound emission waves. The device also includes processing logic capable of receiving the first and second ultrasound waves and displaying those waves on a display device.

24 Claims, 5 Drawing Sheets

CONFIGURABLE ULTRASOUND MEASUREMENT LOGIC IN A MOBILE COMPUTING DEVICE

FIELD OF THE INVENTION

The invention relates to configurable ultrasound Doppler measurements using mobile devices.

BACKGROUND OF THE INVENTION

There are many usage models for Ultrasound Doppler technology such as the ability to find the location and velocity of a target object, monitoring a baby's heartbeat in utero, or measuring the thickness of an object. Devices capable of performing these usages are generally unique and focused on a specific application.

Smartphones and other similar mobile computing devices have become the predominant technological devices that people carry around with them to perform a wide variety of tasks, such as making phone calls, sending emails, taking pictures, and surfing the web while on the go. With each successive wave of mobile computing devices that are introduced, more functionality continues to be integrated to allow the smartphones/devices to perform an ever-increasing array of tasks.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Merging Ultrasound Doppler technology into a mobile computing device creates a new area of functionality for smartphones, tablets, and other mobile computing devices. Below, embodiments of a mobile computing device with integrated and configurable ultrasound Doppler technology are disclosed.

Figure 1:
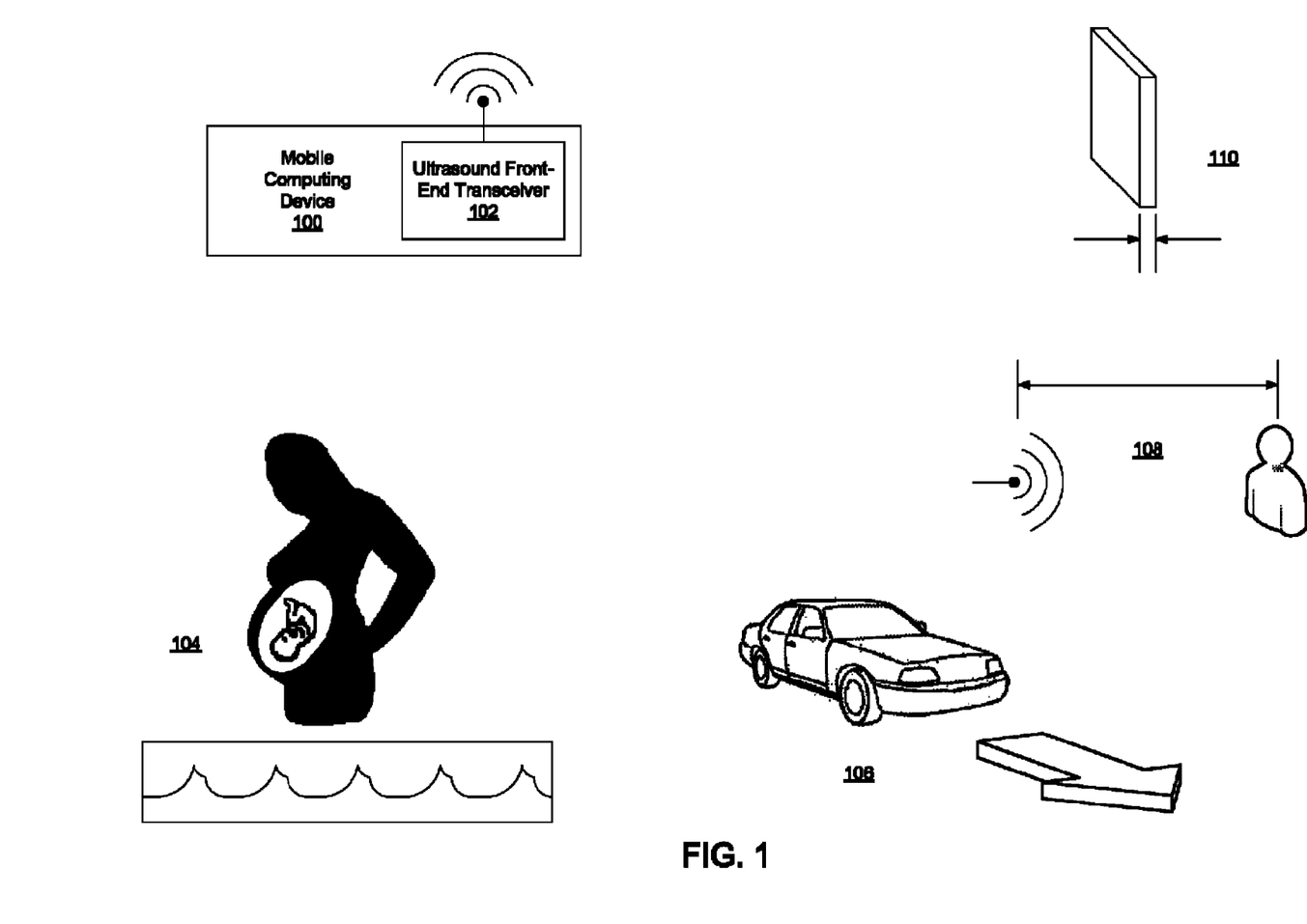
FIG. 1 illustrates general usages for an embodiment of a configurable ultrasound Doppler mobile computing device.

FIG. 1 illustrates general usages for an embodiment of a configurable ultrasound Doppler mobile computing device.

Figure 3:
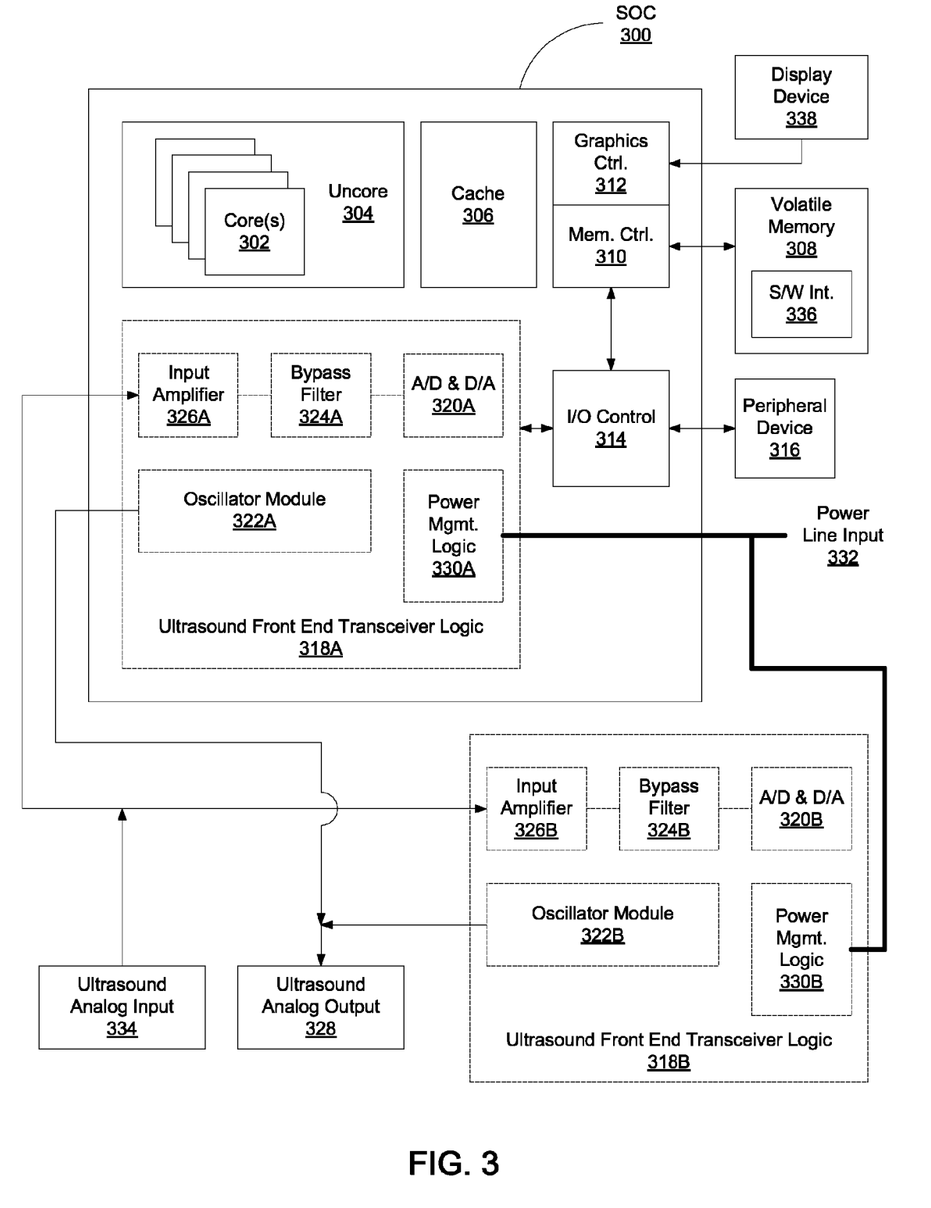
FIG. 3 illustrates multiple embodiments of a computer system adapted to include configurable ultrasound Doppler logic.

A mobile computing device 100 may comprise a cellular phone (such as a smartphone), a tablet computing device, a netbook computing device, a laptop computing device, or any one of many other types of mobile computing devices. Details of at least some of these described mobile computing devices are shown in FIG. 3. Returning to FIG. 1, the mobile computing device may include ultrasound front-end transceiver logic 102. This transceiver logic includes hardware to receive and transmit ultrasound waves at many different frequencies and also at many different emission/transmission power levels. The ability to transmit ultrasound Doppler waves at differing frequency and power levels allows the transceiver logic 102 to be capable of multiple ultrasound Doppler applications, such as:

104: Monitoring an in utero baby's heartrate using Doppler mechanism.

106: Pulse/continuous-wave Doppler radar to find a velocity of a target object.

108: Pulse/continuous-wave Doppler radar to find the distance/location of a target object.

110: Measuring the thickness of an object using Doppler mechanism.

Other applications may be utilized and can be customized for an individual use by changing the Doppler wave frequency as well as the power level used for emission purposes. This dynamic modification of both emission frequency and power will allow a smartphone or other mobile computing device with this technology to configure the device for the intended purpose at any point in time. The usages for a given mobile computing device may be always enabled for user configuration or they may be disabled at the purchase of the mobile computing device and certain frequency and power emission ranges may be unlocked through the use of a network-based mobile store. For example, the ultrasound capabilities may be purchased all at once to allow for full configuration of frequency and power ranges or a given frequency/power combination may be purchased separately to allow for the ultrasound Doppler technology in the mobile computing device to be utilized specifically for a single application (e.g. object thickness measurement).

Figure 2:
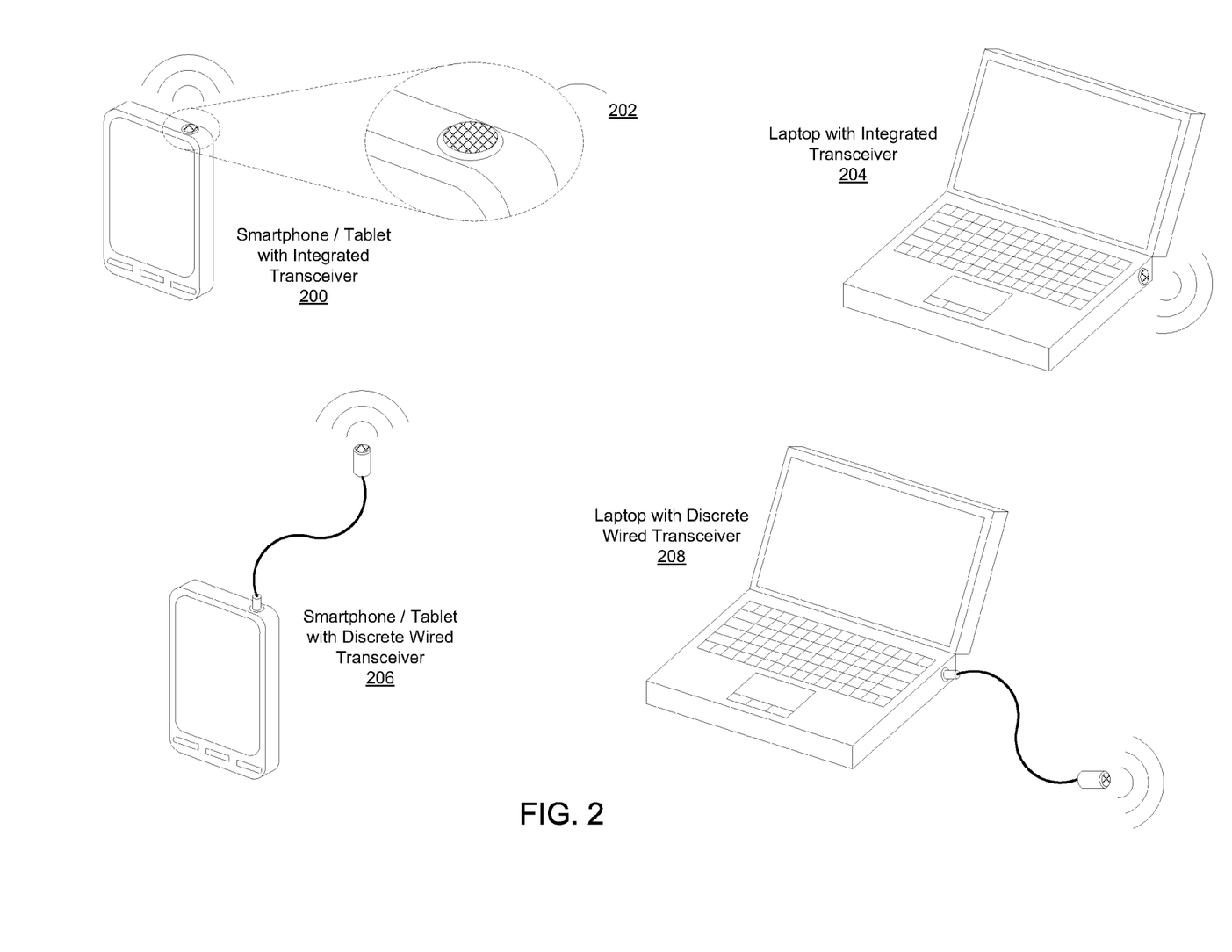
FIG. 2 illustrates several embodiments of how an ultrasound Doppler analog transceiver may be adapted to different mobile computing devices.

FIG. 2 illustrates several embodiments of how an ultrasound Doppler analog transceiver may be adapted to different mobile computing devices. For example, embodiment 200 shows a smartphone/tablet device with an integrated analog transceiver at the edge of the device. Expanded view 202 shows a zoomed in view of the integrated transceiver in the smartphone/tablet.

Embodiment 204 shows a laptop with an integrated ultrasound Doppler analog transceiver. Embodiment 206 shows a smartphone/tablet with a discrete analog transceiver that is at the end of a wire, where the other end of the wire includes a plug that plugs into a receptacle on the smartphone/tablet. The male/female plug receptacle may be utilizing any interface that is compatible with both the phone and the discrete wired analog transceiver. For example, the plug interface may be a Universal Serial Bus (USB) or USB 2 standard interface if the analog transceiver at the other end of the wire also includes analog-to-digital (A-to-D) conversion logic), it may be a mini headphone jack interface, or it may be any other compatible interface that would allow communication between the analog transceiver and the mobile computing device.

Embodiment 206 shows a laptop with a discrete analog transceiver that is at the end of a wire.

In other embodiments that are not shown, the discrete analog transceiver may not have a plug and wire interface, but it rather attached to a portion of the case of a smartphone/tablet/laptop/etc. through a plug or slot without the wire. In other words, the discrete analog transceiver may be firmly attached to the edge of the smartphone/tablet/laptop/etc. case through the use of a latching, buckling or other secure attaching mechanism rather than attached through a bendable wire.

FIG. 3 illustrates multiple embodiments of a computer system adapted to include configurable ultrasound Doppler logic. The computer system may be smartphone, tablet, laptop, automobile-based integrated computing system, or any other type of mobile computing device. In some embodiments, the computer system may include a system on a chip (SoC) 300 layout, where significant logic is integrated on the same silicon die as the processor(s). In other embodiments that are not shown, the SoC box 300 in FIG. 3 may not be present and several or all of the logic boxes located on the SoC 200 are actually discrete logic circuits.

In FIG. 3, the SoC 300 includes one or more central processing cores (302). Each core may include an instruction and/or data cache, a scheduling unit, a data fetching unit, an execution unit, a retirement unit, a floating point unit, and/or many other logical units that generally make up central processing cores. The cores are coupled to the uncore 304, which includes additional logic to assist the cores 302 in execution to programming code, for example, microcode to boot the cores, inter-core and inter-processor communication logic may be situated in the uncore 304 among other logic.

The cores 302 operate upon instructions that are stored, at different times, in several locations. Although the instructions are eventually brought into the instruction cache(s) in each core, they are brought in through a shared cache 306, which pulls instructions and data from a general memory, such as volatile memory 308. A memory request from a core is routed through a memory controller 310, which schedules read and write requests to the memory 308.

In some embodiments, volatile memory 308 may be a form of dynamic random access memory (DRAM), such as double data rate (DDR) synchronous DRAM. In other embodiments that are not shown, memory 308 may not be volatile, but rather persistent, such as a type of flash memory or phase change memory (PCM).

Additionally, in some embodiments, the SoC includes a graphics controller 312 to allow the display of graphics information on a display device (the display device is not shown). The graphics controller 312 may reserve a section of volatile memory 308 for storage of graphics information such as textures, vertices, and frame buffers. In these embodiments, the graphics controller 312 may coordinate with the memory controller 310 to send and receive graphics information with the volatile memory 308. In other embodiments that are not shown, the graphics controller 312 may have reserved a completely separate memory for use exclusively for graphics information storage.

The SoC also includes input/output (I/O) control logic 314 to coordinate communication between the other SoC 300 logic, such as the core(s) 302, and any I/O logic internal or external to the SoC 300. For example, I/O control logic 314 may include a USB controller to allow communication between any USB peripheral devices coupled to (e.g., plugged into) the SoC 300 through an I/O interface. Thus, peripheral device 316 may be a USB device plugged into the SoC 300 through a USB plug interface and I/O control logic 314 may include USB logic to translate USB communication packets being received from the peripheral device 316 into native information able to be understood by the core(s) 302. Although the USB protocol is being utilized as the example, another peripheral device utilizing a different protocol also may be communicatively coupled through I/O control logic 314 to the rest of the logic within the SoC 300.

In many embodiments, one peripheral subsystem coupled to SoC 300 logic through I/O control logic 314 is ultrasound front-end transceiver logic (UFETL) 318. FIG. 3 shows two possible locations where UFETL 318 may be located. Location A (i.e., 318A) is integrated within the SoC 300, whereas location B (i.e., 318B) is discrete from the SoC 300. It is important to note that the specific sub-portions of ultrasound front-end transceiver logic (320-324) also utilize the integrated and discrete numbering systems ("A" and "B" versions).

The UFETL 318 includes analog-to-digital and digital-to-analog (A/D and D/A) conversion logic 320, an oscillator module 322, a bypass filter 324, and an amplifier 326.

In a third embodiment that is not shown, a portion of the UFETL 318 may be integrated into the SoC 300 and another portion may be discrete from the SoC 300.

The UFETL 318 comprises a hardware module that has the capability of generating an ultrasound frequency, transmitting the ultrasound frequency sound wave, and receiving the ultrasound frequency sound wave. In many embodiments, the general purpose of sending and receiving the ultrasound frequency sound wave is to perform one or more measurements based on the sound wave characteristics as it is first transmitted and later received.

The UFETL 318 may receive commands from the core(s) 302 through I/O control 314 to generate a certain type of ultrasound frequency sound wave. The characteristics of the wave may be determined by a software interface 336 being executed by the core(s) 302. The software interface 336 may have the capability to fine tune the UFETL 318 for the type of ultrasound frequency sound wave to be utilized. Details regarding an embodiment of a software interface 336 capable of performing these tasks is discussed in detail below in regard to FIG. 4.

Returning to FIG. 3, the commands received from the core(s) 302 may cause the oscillator module 322 to generate a specific ultrasound frequency sound wave. In many embodiments, the oscillator module 322 includes one or more crystals that vibrate when applied with power. The crystal vibrations are generally at a given frequency. In many cases, logic within the oscillator module may tune the crystal(s) to a desired emission frequency. In some embodiments, the D/A conversion logic 320 may translate a digital frequency requested from a core command into a representative analog frequency utilized to set the emission frequency in the oscillator module 322.

In many embodiments, the generated ultrasound emission frequency is passed to an ultrasound analog output device 328, which emits the ultrasound frequency sound wave into the air or through another medium (e.g., water, wood, metal, human body, etc.). In different embodiments, the ultrasound analog output device 328 may be integrated into the computing device housing the UFETL 318 or connected to the computing device through an external plug/cable (FIG. 2 illustrates several of these different embodiments). In some embodiments, the ultrasound analog output device 328 may be a form of a transducer. In many embodiments, the ultrasound analog output 328 may be referred to as an ultrasound emission module.

Ultrasound applications are varied in use and different applications do not just utilize a range of different frequencies, but they also utilize various levels of power for the emission. Thus, the UFETL 318 includes the ability to manage the power level of the emission through power management logic 330, which is coupled to a power line input 332. For example, the power management logic 330 may dictate the power level of the ultrasound emission frequency through a voltage regulator or another similar power regulation device. The power line input 332 may come from a voltage rail tied to a specific power plane on a motherboard (not pictured) or other type of printed circuit board or other board that includes power delivery lines to distribute power from a power source such as a 110V AC outlet or a battery to the components within the computing device housing the UFETL 318.

After the ultrasound frequency sound wave is emitted from the ultrasound analog output device 328, the wave travels through a medium to one or more objects, bounces off of the one or more objects and travels back to the computing device. The returning ultrasound frequency sound wave is received by the ultrasound analog input 334, which passes the wave in analog format to input amplifier 326. The amplifier amplifies the ultrasound wave. Unfortunately, it is quite likely that other frequency sound waves were also picked up by the ultrasound analog input 334. Thus, after the ultrasound wave is amplified to more easily detect the wave details, the results are passed through a bypass filter 324. The bypass filter removes all unwanted sound wave frequencies from the input and allows only the frequency in question to pass through to the A/D converter 320. The A/D converter converts the wave information to digital format and the digital information is then passed through the I/O control 314 back to the core(s) 302 to be stored and/or utilized by an ultrasound software interface 336 for display on a display device 338 or otherwise.

Figure 4:
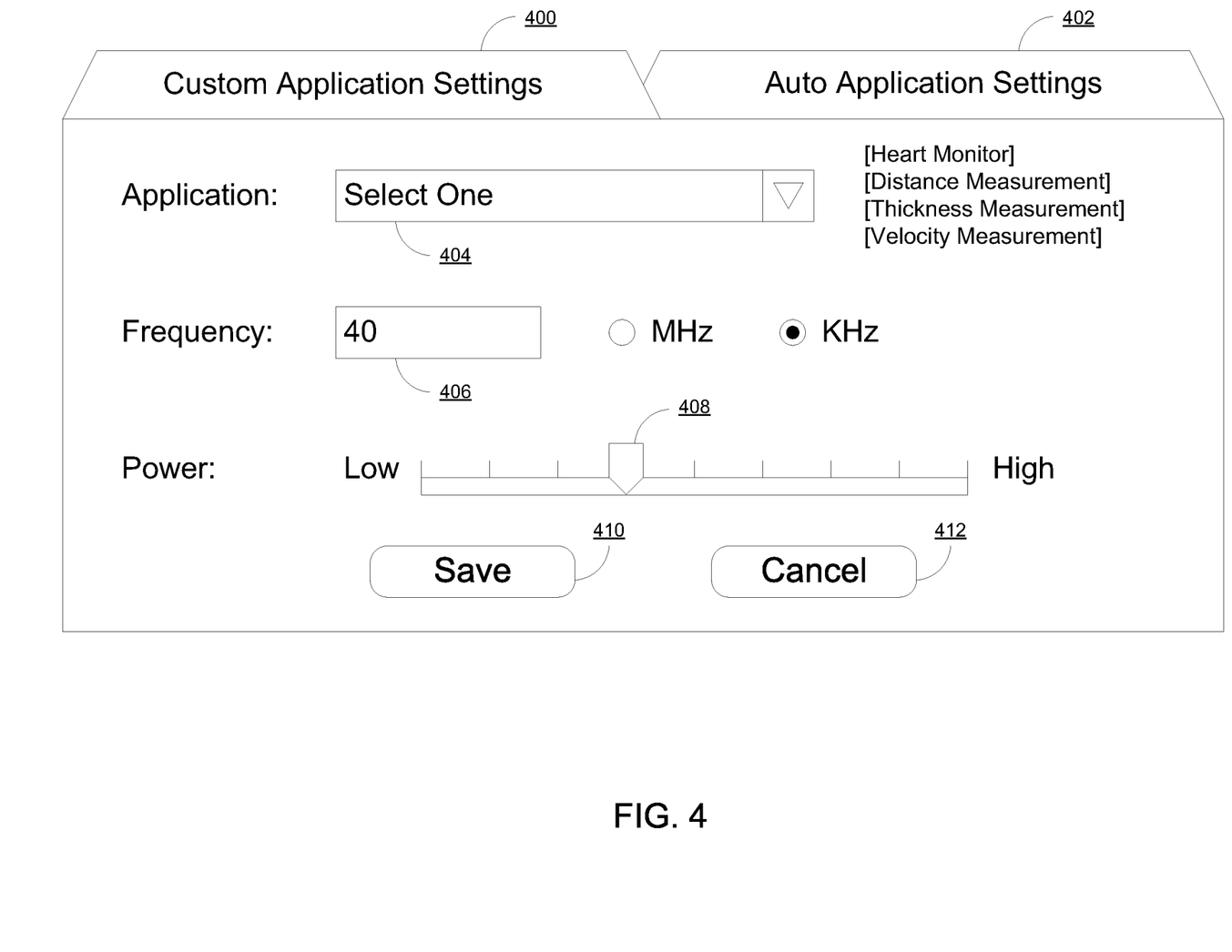
FIG. 4 illustrates an embodiment of a software interface for controlling configurable ultrasound Doppler logic in a computing device.

Returning to the software interface capable of configuring, using, and monitoring ultrasound frequency generation hardware logic, such as the UEFTL 318, FIG. 4 illustrates an embodiment of a software interface for controlling configurable ultrasound Doppler logic in a computing device.

The software interface may include settings for custom applications 400 and settings for automatic applications. Although not shown, the automatic application settings 402 may give you several choices of applications, such as using the ultrasound Doppler logic as a heart monitor or a velocity measurement, but it may use pre-determined settings. So you may select the application and the software interface then gives you a pre-determined frequency setting and a predetermined power setting.

Regarding custom application settings 400, the software interface could allow you to name the application and/or select from a list of applications from drop down box 404. Then after selecting the name of the application the ultrasound Doppler logic will be used for, you could then type in the frequency you would like the ultrasound frequency to be set to at frequency setting 406 (e.g., 40 KHz). Then the software interface may give you the ability to set the power utilized for the ultrasound wave emission application in a power setting feature 408. The power setting feature may include several settings with a readout (not shown) that displays the specific number of Watts utilized to power the emission, which would correlate to a strength of the wave being emitted.

After selecting the custom settings, the software interface may allow saving (410) the specific frequency and power settings to go along with the application as named or similarly, to reset the settings to a generic value, the software interface may allow cancelling (412) the custom settings that were entered into the device.

Additionally, there may be safety measures associated with the software interface, such as a case where the ultrasound wave emission logic is in a cell phone and the software interface may terminate cell phone usage/frequency emissions when set to utilize the ultrasound device for a baby heart rate monitor.

In custom application settings 400, new applications may be created that are utilized for specific situations outside of the standard applications with auto settings. Additionally, custom application settings 400 can tweak a frequency or power setting in case the application is not coming up with good measurement results due to environmental factors or otherwise.

Furthermore, although not shown, the software interface may also allow for saving of data as a result of the use of an ultrasound frequency measurement.

Finally, the software interface may also allow for the customization of the data retrieved, such as additional parameters like time stamps of waves sent and received, scale of display of frequencies values shown, etc.

Figure 5:
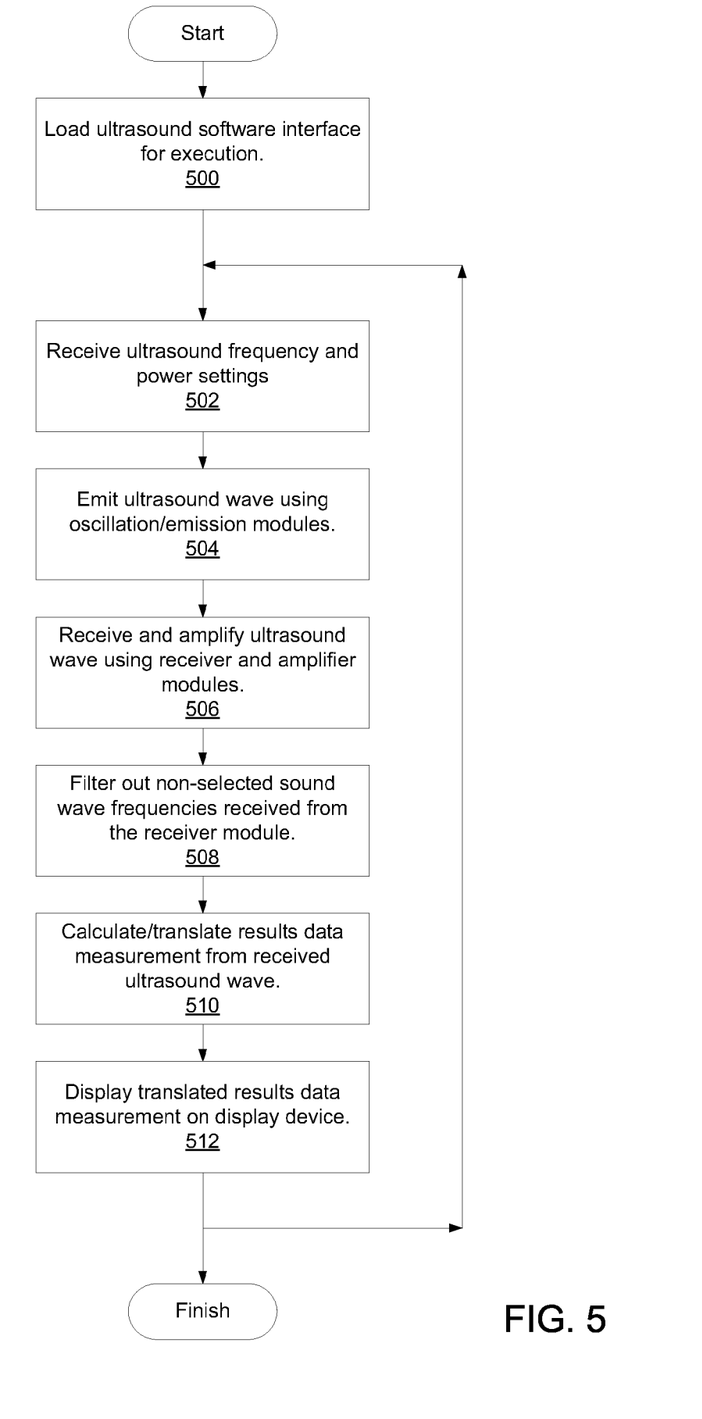
FIG. 5 is a flow diagram of an embodiment of a process to test, measure, and display an ultrasound frequency wave application on a mobile computing device.

FIG. 5 is a flow diagram of an embodiment of a process to test, measure, and display an ultrasound frequency wave application on a mobile computing device.

The process begins with processing logic loading an ultrasound measurement software interface for execution (processing block 500). In some embodiments, the loading process may include loading a set of instructions that comprises the software interface into a memory in a computing device (e.g., into volatile memory 308 in FIG. 3). In other embodiments, the software interface may be loaded directly into storage on the same die as one or more processors in the computing device (such as into a cache). In different embodiments, the software interface, when not in use may be stored in non-volatile storage such as in a flash memory, a phase change memory, a solid-state drive, or a hard disk drive, among other non-volatile storage mediums.

Next, processing logic will receive ultrasound frequency and power settings (processing block 502) to set the parameters for the emission of the ultrasound wave. The frequency and power settings may be retrieved from storage as a predetermined default frequency and power setting. Otherwise, the software interface may prompt a user to select a type of ultrasound application to utilize and either with pre-determined default settings per application or customized settings, the software interface will set the frequency and power settings for the emission process.

Then, an oscillation/emission module in the computing device and will cause the oscillation/emission module to emit the ultrasound wave (processing block 504) using the frequency and power settings determined in block 502. This emission can last for a certain length of time. The length of time determines the number of waves sent and may be a predetermined factor depending on the application the ultrasound wave is being used for measurement. For example, one ultrasound wave may be sent or multiple waves may be sent depending on the application. In other embodiments, the length of time the ultrasound wave emission lasts can be customized in the software interface.

A certain amount of time after the ultrasound wave emission in block 504, receiver and amplifier module(s) will receive and amplify the ultrasound wave (processing block 506). Once amplified, a filter module filters out non-selected sound wave frequencies received from the receiver module to isolate the selected ultrasound wave frequency that was received (processing block 508). The filtering process cancels noise to show clear reception of the ultrasound frequency in question.

Next, processing logic and analog-to-digital conversion logic will calculate and translate the ultrasound frequency results data measurement from the received ultrasound wave (processing block 510). This calculation/translation process will convert the analog signal to a digital counterpart, it may also measure the magnitude of the wave, include a time stamp with the wave, and potentially create textual or graphical data results ready for display.

Finally, processing logic will display the results data measurement, formatted by the calculation/translation process, on a display device (processing block 512). For example, if the processing logic resides within a mobile cellular phone, the display process may display the results of the ultrasound wave measurement on the phone's graphical display screen. The format of what is displayed may be in a default configuration or customized by a user.

After the measurement has been completed, the process may either end or start again to receive the ultrasound frequency and power settings at block 502. For a second time through the process flow, the user may elect to take the same measurement a second time or use the ultrasound Doppler measurement logic for a completely different type of measurement. For example, the user may first measure the speed of a baseball and then measure the thickness of a baseball bat. On the other hand, if the measurement does not yield accurate results, the user may want to measure the speed of a baseball several times and fine tune the frequency and power settings to get more accurate readings/measurements.

Elements of embodiments of the present invention may also be provided as a non-transient machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of non-transient machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A cellular communication device comprising:
a network interface to communicate over a cellular communication network with at least one remote device;
a system-on-a-chip comprising (i) a main processor of the cellular communication device and (ii) an ultrasound front end transceiver logic, wherein the ultrasound front end transceiver comprises:
an oscillator module to generate an ultrasound signal at an ultrasound frequency, wherein the ultrasound frequency is user selectable to a first ultrasound frequency or a second ultrasound frequency different from the first ultrasound frequency,
a power management logic to set a power level of the ultrasound signal, wherein the power level is user selectable to a first power level or a second power level different from the first power level, and
processing logic to process returning ultrasound waves received in response to emission of the ultrasound signal to generate a digital representation of the returning ultrasound waves;
an ultrasound transceiver comprising:
an ultrasound emission module to selectively emit the ultrasound signal at the ultrasound frequency and power level, and
an ultrasound receiver to receive returning ultrasound waves in response to emission of the ultrasound signal;
wherein the main processor is to display the digital representation on a display of the cellular communication device.

2. The cellular communication device of claim 1, wherein the processing logic of the ultrasound front end transceiver further comprises an input amplifier to amplify the returning ultrasound waves received in response to the ultrasound signal and from the ultrasound receiver.

3. The cellular communication device of claim 2, wherein the processing logic of the ultrasound front end transceiver further comprises a bypass filter to filter out sound waves from the received ultrasound waves that have frequencies other than ultrasound frequency.

4. The cellular communication device of claim 3, wherein the processing logic of the ultrasound front end transceiver further comprises an analog-to-digital conversion logic to convert the returning ultrasound waves to generate the digital representation.

5. The cellular communication device of claim 1, wherein the main processor is to generate a user interface on the display to facilitate user selection of the ultrasound frequency and the power level.

6. The cellular communication device of claim 5, wherein the first frequency, the second frequency, the first power level, and the second power level are predefined.

7. The cellular communication device of claim 5, wherein the main processor is to determine the ultrasound frequency and the power level of the ultrasound signal based on the user selection.

8. The cellular communication device of claim 5, wherein to generate the user interface comprises to generate a user interface having a plurality of predefined frequencies and a plurality of predefined power levels selectable by a user of the cellular communication device.

9. The cellular communication device of claim 1, wherein the main processor is further to configure an output data format for display of the digital representation, wherein the output data format corresponds to a measurement type.

10. The cellular communication device of claim 9, wherein the measurement type is one of at least a vibration measurement, an object speed measurement, or an object thickness measurement.

11. One or more non-transitory, computer-readable storage media comprising a plurality of instructions stored thereon that, in response to execution, cause a cellular communication device to:
    communicate, by a network interface of the cellular communication device and over a cellular communication network, with at least one remote device;
    generate, by an oscillator module of an ultrasound front end transceiver of a system-on-a-chip of the cellular communication device, an ultrasound signal at an ultrasound frequency, wherein the ultrasound frequency is user selectable to a first ultrasound frequency or a second ultrasound frequency different from the first ultrasound frequency;
    set, by a power management logic of the ultrasound front end transceiver, a power level of the ultrasound signal, wherein the power level is user selectable to a first power level or a second power level different from the first power level;
    emit, by an ultrasound emission module of an ultrasound transceiver of the cellular communication device, the ultrasound signal at the ultrasound frequency and power level;
    receive, by an ultrasound receiver of the ultrasound emission module, returning ultrasound waves in response to emission of the ultrasound signal;
    process, by processing logic of the ultrasound front end transceiver, the returning ultrasound waves to generate a digital representation of the returning ultrasound waves; and
    display, by a main processor of the system-on-a-chip, the digital representation on a display of the cellular communication device.

12. The one or more non-transitory, computer-readable storage media of claim 11, wherein the plurality of instructions further cause the cellular communication device to amplify, the processing logic, the returning ultrasound waves received in response to the ultrasound signal and from the ultrasound receiver.

13. The one or more non-transitory, computer-readable storage media of claim 12, wherein the plurality of instructions further cause the cellular communication device to filter out, by a bypass filter of the processing logic, the received sound waves from the received ultrasound waves that have frequencies other than ultrasound frequency.

14. The one or more non-transitory, computer-readable storage media of claim 13, wherein the plurality of instructions further cause the cellular communication device to convert, by an analog-to-digital conversion logic of the processing logic, the returning ultrasound waves to generate the digital representation.

15. The one or more non-transitory, computer-readable storage media of claim 11, wherein the plurality of instructions further cause the cellular communication device to generate, by the main processor, a user interface on the display to facilitate user selection of the ultrasound frequency and the power level.

16. The one or more non-transitory, computer-readable storage media of claim 15, wherein the first frequency, the second frequency, the first power level, and the second power level are predefined.

17. The one or more non-transitory, computer-readable storage media of claim 15, wherein to generate the user interface comprises to generate a user interface having a plurality of predefined frequencies and a plurality of predefined power levels selectable by a user of the cellular communication device.

18. A method comprising:
    communicating, by a network interface of a cellular communication device and over a cellular communication network, with at least one remote device;
    generating, by an oscillator module of an ultrasound front end transceiver of a system-on-a-chip of the cellular communication device, an ultrasound signal at an ultrasound frequency, wherein the ultrasound frequency is user selectable to a first ultrasound frequency or a second ultrasound frequency different from the first ultrasound frequency;
    setting, by a power management logic of the ultrasound front end transceiver, a power level of the ultrasound signal, wherein the power level is user selectable to a first power level or a second power level different from the first power level;
    emitting, by an ultrasound emission module of an ultrasound transceiver of the cellular communication device, the ultrasound signal at the ultrasound frequency and power level;
    receiving, by an ultrasound receiver of the ultrasound emission module, returning ultrasound waves in response to emission of the ultrasound signal;
    processing, by processing logic of the ultrasound front end transceiver, the returning ultrasound waves to generate a digital representation of the returning ultrasound waves; and
    displaying, by a main processor of the system-on-a-chip, the digital representation on a display of the cellular communication device.

19. The method of claim 18, further comprising amplifying, by the processing logic, the returning ultrasound waves received in response to the ultrasound signal and from the ultrasound receiver.

20. The method of claim 19, further comprising filtering out, by a bypass filter of the processing logic, the received sound waves from the received ultrasound waves that have frequencies other than ultrasound frequency.

21. The method of claim 20, further comprising converting, by an analog-to-digital conversion logic of the processing logic, the returning ultrasound waves to generate the digital representation.

22. The method of claim 18, further comprising generating, by the main processor, a user interface on the display to facilitate user selection of the ultrasound frequency and the power level.

23. The method of claim 22, wherein the first frequency, the second frequency, the first power level, and the second power level are predefined.

24. The method of claim 22, wherein generating the user interface comprises generating a user interface having a plurality of predefined frequencies and a plurality of predefined power levels selectable by a user of the cellular communication device.

\* \* \* \* \*